United States Patent
Barezzani

(10) Patent No.: US 11,607,787 B2
(45) Date of Patent: Mar. 21, 2023

(54) COMPRESSION OR CUTTING TOOL AND METHOD FOR OPERATING A COMPRESSION OR CUTTING TOOL

(71) Applicant: Cembre S.p.A., Brescia (IT)

(72) Inventor: Gualtiero Barezzani, Brescia (IT)

(73) Assignee: Cembre S.p.A., Brescia (IT)

( * ) Notice: Subject to any disclaimer, the term of this patent is extended or adjusted under 35 U.S.C. 154(b) by 707 days.

(21) Appl. No.: 16/604,643

(22) PCT Filed: Apr. 12, 2018

(86) PCT No.: PCT/IB2018/052557
§ 371 (c)(1),
(2) Date: Oct. 11, 2019

(87) PCT Pub. No.: WO2018/189706
PCT Pub. Date: Oct. 18, 2018

(65) Prior Publication Data
US 2021/0129310 A1    May 6, 2021

(30) Foreign Application Priority Data
Apr. 13, 2017    (IT) .................. 102017000041541

(51) Int. Cl.
| | |
|---|---|
| *B25F 3/00* | (2006.01) |
| *B21D 39/04* | (2006.01) |
| *B23D 29/00* | (2006.01) |
| *B25B 27/02* | (2006.01) |
| *B25F 5/00* | (2006.01) |
| *H01R 43/042* | (2006.01) |
| *G01M 13/00* | (2019.01) |

(52) U.S. Cl.
CPC .............. *B25F 3/00* (2013.01); *B21D 39/048* (2013.01); *B23D 29/002* (2013.01); *B25B 27/026* (2013.01); *B25F 5/005* (2013.01); *G01M 13/00* (2013.01); *H01R 43/0428* (2013.01)

(58) Field of Classification Search
CPC . B21D 7/07; B21D 9/08; B23D 29/00; B23D 29/002; B23D 29/005; B23P 11/005; B25B 27/02; B25B 27/026; G01L 5/00; G01L 5/0076; G01L 5/0085; G01L 5/009; G01L 5/226; G01L 5/228; G01L 5/0028; G01L 5/0038; H01R 43/0427; H01R 43/0428; H01R 43/048
See application file for complete search history.

(56) References Cited

U.S. PATENT DOCUMENTS

| | | | |
|---|---|---|---|
| 2008/0276678 A1* | 11/2008 | Pacaud | B25B 27/146 72/21.4 |
| 2014/0083149 A1 | 3/2014 | Wagner et al. | |
| 2016/0363510 A1 | 12/2016 | Kanack et al. | |

FOREIGN PATENT DOCUMENTS

| | | | | |
|---|---|---|---|---|
| WO | WO 2016/005838 A1 | 1/2016 | | |
| WO | WO-2016005838 A1 * | 1/2016 | ........... | B21D 39/048 |

* cited by examiner

*Primary Examiner* — Tyrone V Hall, Jr.
(74) *Attorney, Agent, or Firm* — Blank Rome LLP

(57) ABSTRACT

A working head (1) for a compression or cutting tool (100) comprises a connecting portion (3) for a removable connection of the working head (1) with an actuation part (2) of the tool (100), two jaws (4) movable between an open position and a closed position to perform the compression or cutting, and a local storage (6) configured for storing one or more cumulative data representative of a stress history of the jaws (4), wherein the local storage (6) is fixed to the working head (1).

19 Claims, 3 Drawing Sheets

Figure 1:
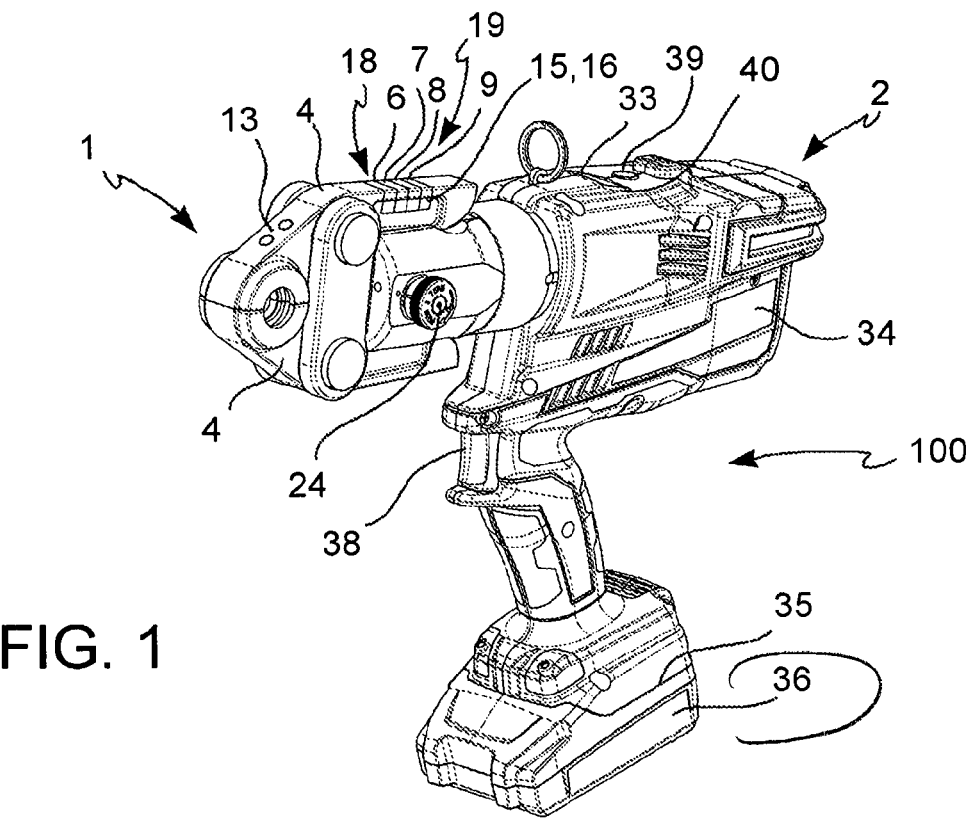

COMPRESSION OR CUTTING TOOL AND METHOD FOR OPERATING A COMPRESSION OR CUTTING TOOL

The present invention relates to a working head and an actuation part for a compression or cutting tool, to the compression or cutting tool, and to a method for operating the compression or cutting tool.

Hydrodynamic or electromechanical compression and/or cutting tools are often used to perform certain connection operations, for example the compression of connectors around electrical wires or for hydraulic pipes, the compression of rivets, or cutting operations, for example, the cutting of electrical wires during the installation and maintenance of electrical systems.

Such tools usually comprise an electric motor supplied by an accumulator and a hydraulic pump, which causes an increase in pressure of a hydraulic fluid acting on a piston to move the latter against the force of a pressure spring. The piston is connected, in turn, to jaws, so as to move them, during the compression or cutting operation, against each other.

The jaws can be removably connectable to the tool, interchangeable and replaceable. Similarly, the jaws, in turn, can be provided with interchangeable and replaceable accessory elements, the so-called matrices, for adapting one same jaw unit to a particular object, for example, an electrical contact or a hydraulic connection to be compressed, a metal bar to be cut.

Due to the cyclic stress, the jaws are subject to fatigue and wear breakage. The occurrence of fatigue crack mainly, but not only, affects the regions of the jaws subject to flexural traction tension. Wear mainly affects the cam tracks on which the actuation piston acts and the so-called imprint of the jaw, in other words, the shaped surfaces in contact pressing against the object to be compressed.

In order to avoid malfunctioning or incidents caused by fatigue and wear damage, the jaws undergo interventions of maintenance (measuring wear, verification absence cracks) and/or replacements planned at predetermined time intervals, for example, of 3 months or 2 years.

As the intervals of maintenance and replacements do not take into account the real stress history of the jaws, in the case of moderate use of the jaws, they are replaced or sent to the maintenance center far earlier than required, whereas, in the case of intense use of the jaws, they can break unexpectedly or perform incomplete and faulty compressions or cuts far earlier than the next planned intervention of maintenance or replacement. Thus, the need is felt to exploit the fatigue and wear lifespan of the jaws in a better and more predictable manner.

The need is further felt for interchangeability of the jaws with other jaws on the same compression and cutting tool and the possibility to use the same pair of jaws with different compression and cutting tools. This need still represents an obstacle to any form of traceability of the stress of the pairs of jaws.

Therefore, it is the object of the present invention to provide a working head or pair of jaws, a compression or cutting tool and method for operating a compression or cutting tool, having such features as to overcome the aforesaid drawbacks with reference to the prior art.

It is a particular object of the invention to exploit the fatigue and wear lifespan of the jaws in a more complete and predictable manner.

It is a further object to allow the interchangeability of the jaws with other jaws on the same compression and cutting tool and the possibility to use the same pair of jaws with different compression and cutting tools.

These and other objects are achieved by means of a working head for a compression or cutting tool, where said working head comprises:

a connecting portion for a connection of the working head with an actuation part of the tool, two jaws connected in a movable manner with respect to each other and engageable by means of an actuation member so as to perform a relative movement between an open position and a closed position to perform the compression or the cutting, a local storage configured to store one or more cumulative data representative of a stress history of the jaws, said local storage being fixed to the working head.

Due to the local storage of the working head, and the storage of cumulative data representative of a stress history of the jaws directly in the local storage of the working head, each single working head can always carry with it updated information on the state of wear and accumulated fatigue damage thereof, or on the number of work cycles carried out.

Furthermore, the arrangement of the local storage fixed to the working head allows a simple and targeted update of the cumulative data stored for each working head, without needing a central database or coordination between a plurality of working heads used and a plurality of actuation parts used. It is sufficient, for example, to increase, in the local storage, a total number of work cycles with every work cycle carried out, and/or store, in the local storage, a stress value (pressure, force, electrical magnitude motor) with every work cycle carried out. The fixed arrangement of the local storage to the working head ensures the univocal assignment of the stress information to each of the working heads and a targeted use of the stored cumulative stress datum for the working head to which it refers.

This allows the wear and fatigue lifespan of the jaws of the working heads to be exploited in a more complete and predictable manner, while allowing the interchangeability of the jaws with other jaws on the same tool and also the interchangeability of the actuation parts of the compression and cutting tools.

The objects of the invention are further achieved by means of a compression or cutting tool, comprising an actuation part operable for moving an actuation member, a working head with a connecting portion, connecting the working head removably to the actuation part, and to two jaws connected in a movable manner with respect to each other and engageable by the actuation member, so as to perform a relative movement between an open position and a closed position to perform the compression or the cutting, a local storage configured to store one or more cumulative data representative of a stress history of the jaws, said local storage being fixed to the working head and removable from the actuation part together with the working head, a stress detection device configured to detect the implementation of a work cycle by means of the jaws and generate a stress signal referred to said work cycle, a local processor in signal connection with the stress detection device and configured to process the stress signal and modify, in the local storage, the cumulative datum depending on the stress signal.

The objects of the invention are further achieved by means of a method for operating a compression or cutting tool, comprising the steps of:

connecting a working head removably to an actuation part of the tool, where the working head comprises two jaws connected in a movable manner with respect to each other and engageable by an actuation member so as to perform a relative movement between an open position and a closed position to perform the compression or the cutting, performing work cycles, moving the actuation member by means of the actuation part of the tool, storing, in a local storage, one or more cumulative data representative of a stress history of the jaws, where the local storage is fixed to the working head and removable from the actuation part together with the working head, detecting the implementation of said work cycles, generating a stress signal referred to each of said work cycles, processing the stress signal and modifying, in the local storage, the cumulative datum depending on the stress signal.

Figure 2:
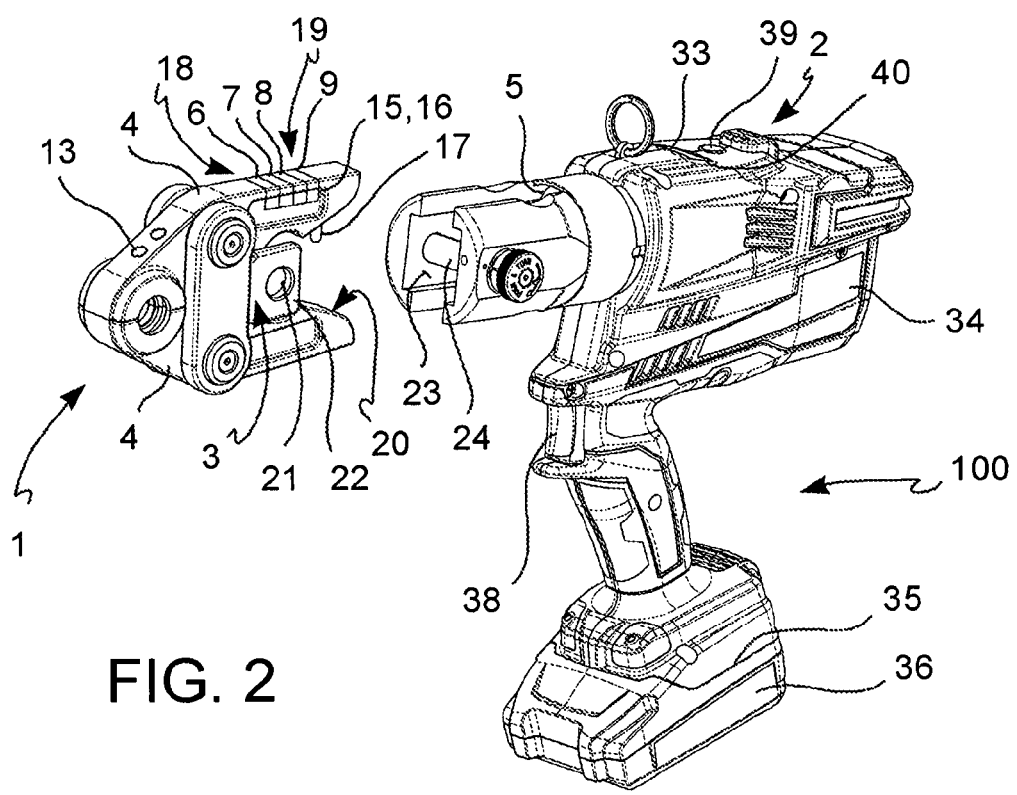
Figure 3:
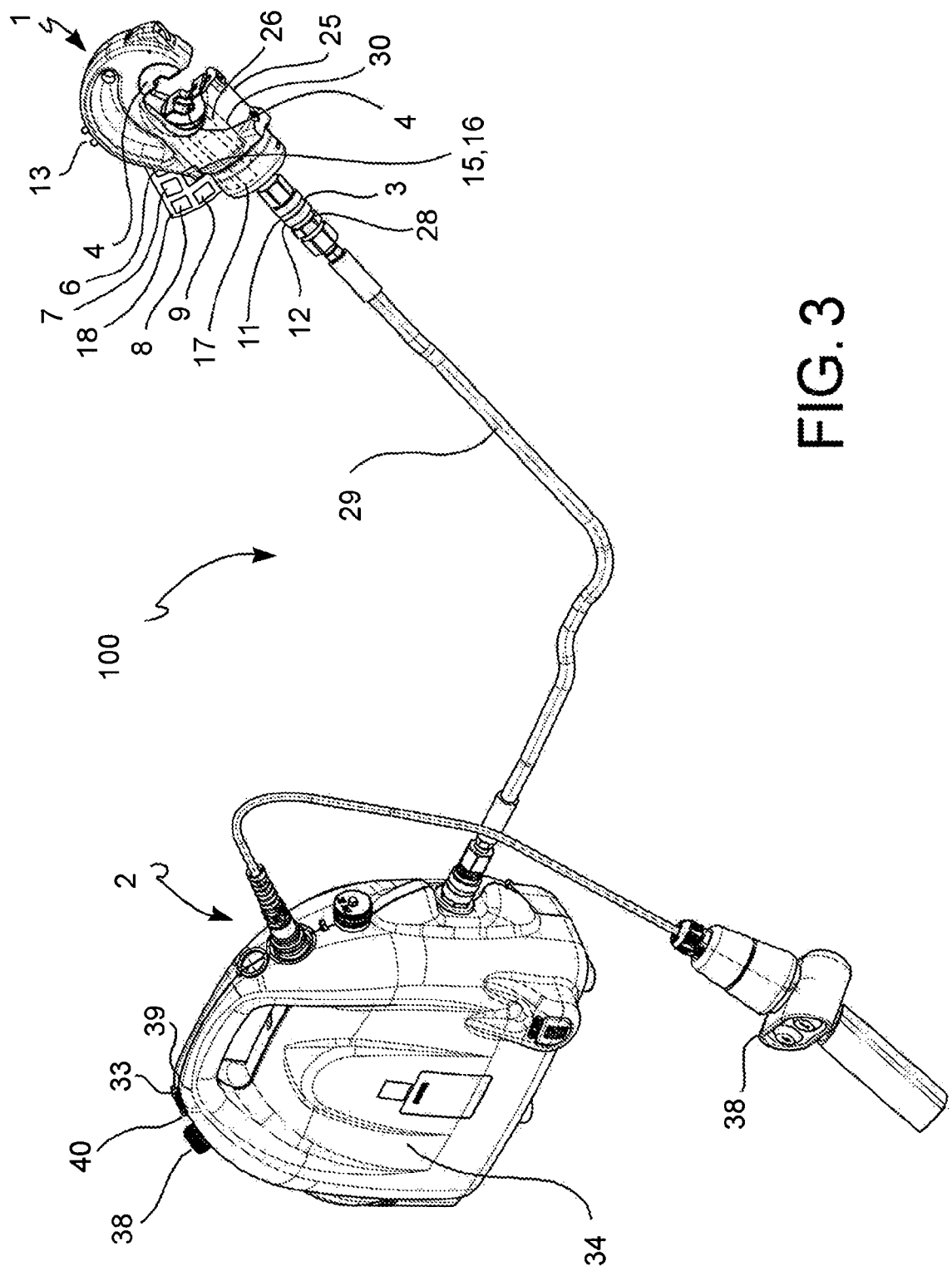
Figure 4:
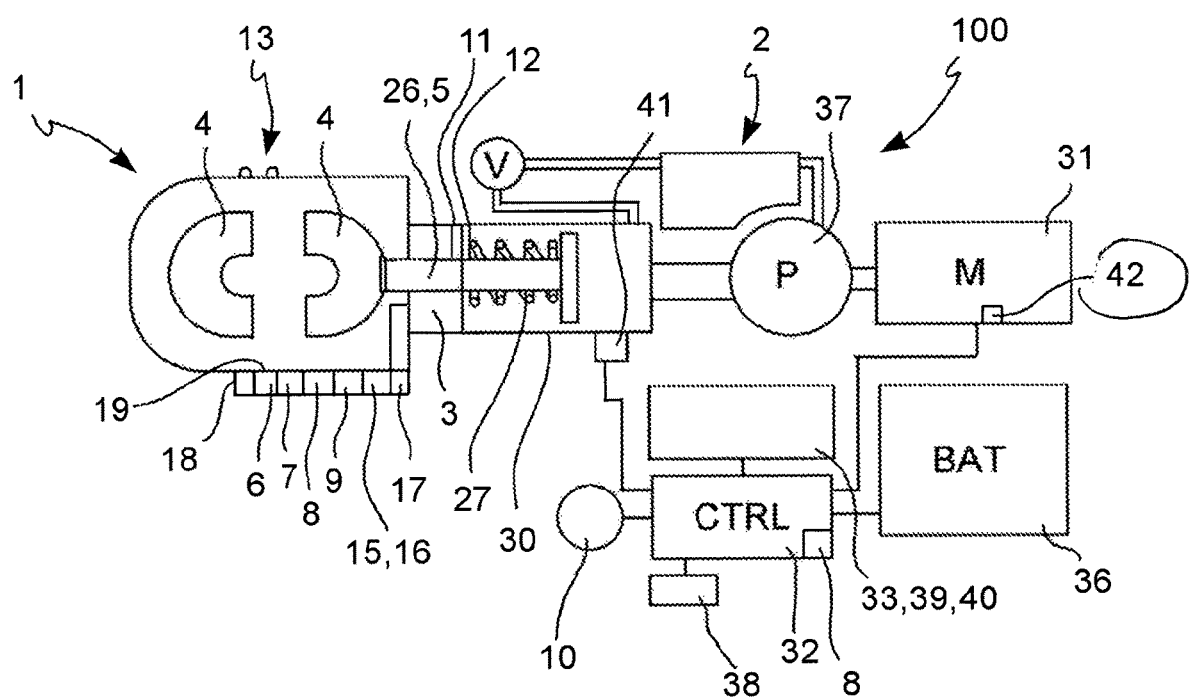

For a better understanding of the invention and to appreciate the advantages thereof, the description of various embodiments will be given below by way of a non-limiting example, with reference to the accompanying drawings, in which:

FIG. 1 is a perspective view of a compression or cutting tool to which a working head is mounted, according to an embodiment, FIG. 2 shows the compression or cutting tool in FIG. 1 with the working head removably detached, FIG. 3 shows a compression or cutting tool according to a further embodiment, FIG. 4 is a schematic illustration of an electrohydraulic compression tool and the control systems thereof according to an embodiment of the invention.

DETAILED DESCRIPTION OF THE WORKING HEAD 1

With reference to the figures, a working head 1 for a compression or cutting tool 100 comprises a connecting portion 3 for a connection of the working head 1 with an actuation part 2 of the tool 100, and two jaws 4 connected in a movable manner with respect to each other and engageable by an actuation member 5 of the working head 1 or the actuation part 2 so that, in response to the displacement of the actuation member 5, the jaws 4 perform a relative movement between an open position and a closed position to perform the compression or the cutting.

The working head 1 further comprises a local electronic storage 6 configured to store one or more cumulative data representative of a stress history of the jaws 4, where said local storage 6 is fixed to the working head 1 and removable together with the working head 1 from the actuation part 2.

Due to the local storage 6 of the working head 1 and the storage of cumulative data representative of a stress history of the jaws 4 directly in the local storage of the working head 1, each single working head 1 can carry with it updated information on the state of wear and accumulated fatigue damage thereof or the number of work cycles carried out.

Furthermore, the arrangement of the local storage 6 fixed to the working head 1 allows the simple and targeted updating of the cumulative data stored for each working head 1, without needing a central database or coordination between a plurality of working heads 1 used and a plurality of actuation parts 2 used. It is sufficient, for example, to increase, in the local storage 6, a total number of work cycles with each work cycle carried out, and/or store, in the local storage 6, a stress value (pressure, force, electrical magnitude, for example, current of the motor) with each work cycle carried out. The fixed arrangement of the local storage 6 to the working head 1 ensures the univocal assignment of the stress information to each of the working heads 1 and a use of the stored cumulative stress datum in a targeted manner for the working head 1 to which it refers.

This allows the wear and fatigue lifespan of the jaws 4 of the working heads 1 to be exploited in a more complete and predictable manner, while allowing the interchangeability of the working heads 1 on the same actuation part 2 and also the interchangeability of the actuation parts 2 themselves.

According to an embodiment, the working head 1 further comprises a local processor 7 configured to process a stress signal indicative of the implementation of a work cycle by means of the jaws 4 and modify the cumulative datum in the local storage 6 depending on the stress signal. The local processor 7 is electrically connected to the local storage 6 and fixed to the working head 1. This allows the cumulative datum to be modified in the local storage 6 without needing an electrical connection between the working head 1 and the actuation part 2.

According to an alternative embodiment, the local processor 7 is not on board the working head 1 but lies in the actuation part 2 and connects electrically to the local storage 6 when the working head 1 is connected to the actuation part 2. In this case, the number and cost of electronic components on board the working head 1 is minimum, but the required electrical connection between the interchangeable working head 1 and the actuation part 2 increases the constructional complexity of the tool 100.

According to a further embodiment, the working head 1 comprises a stress detection device 8 in signal connection with the local processor 7 and configured to detect the implementation of a work cycle by means of the jaws 4 and generate the aforesaid stress signal referred to said work cycle.

The stress detection device 8 is fixed to the working head 1 and electrically connected to the local processor 7. This makes the structure and the operating principle of the stress detection device 8 completely independent from the actuation part 2 and overcomes the need to transmit the stress signal from the actuation part 2 to the working head 1.

According to embodiments, the stress detection device 8 on board the working head 1 can comprise one or more of a force sensor, a deformation sensor, a displacement or distance sensor, a hydraulic fluid pressure sensor, an optical sensor, a linear transducer, a piezoelectric sensor, a magnetic proximity sensor, a contact sensor, a microswitch or a potentiometer, where said sensor/detector is preferably responsive to displacements of the actuation member 5.

According to an alternative embodiment, the stress detection device 8 is not fixed to the working head 1 but lies in the actuation part 2 and connects electrically or by wireless transmission to the local processor 7 when the working head 1 is connected to the actuation part 2.

In this case, the number and the cost of electronic components and sensors of the working head 1 is more reduced, and the detection of the work cycle and magnitudes indicative of the stress of the jaws 4 can be carried out in the actuation unit of the tool 2, detecting, for example, the pressure of a hydraulic fluid or electrical magnitudes of an electric driving motor, which might not be measurable on the working head 1.

For a signal connection between the working head 1 and the actuation part 2, the working head 1 can comprise a local connector 11, for example, electrical and/or optical and/or electromechanical (for example, a pressure button), fixed to the working head 1 and adapted to be removably connected or functionally coupled to a corresponding connector 12 fixed to the actuation part 2.

Alternatively and more advantageously, for the signal connection between (the local processor 7 of) the working head 1 and the actuation part 2, the working head 1 can comprise a local wireless transceiver 9 fixed to the working head 1 and electrically connected to the local processor 7. The local wireless transceiver 9 is configured for a wireless communication with a corresponding wireless transceiver 10 of the actuation part 2.

The local transceiver 9 of the working head 1 and/or the transceiver 10 of the actuation part 2 preferably comprise one or more transmitters or receivers and/or transceivers of radio waves, alternatively of optical signals, for example, infrared radiation or laser.

Advantageously, the local transceiver 9 of the working head 1 and the transceiver 10 of the actuation part 2 are configured to establish the wireless communication only when the working head 1 is in the connected position with the actuation part 2, and only between the actuation part 2 and the working head 1, connected to each other, for example, by means of a wireless directional transmission mode and/or at a limited distance.

According to an embodiment, the local processor 7 is configured to generate and provide a cumulative state signal depending on the cumulative datum stored in the local storage 6.

The cumulative state signal can comprise:

the total number of work cycles of the working head 1 and/or a residual number of work cycles of the working head 1 to reach a limit value of work cycles, said limit value of work cycles being predetermined or calculated based on a predetermined limit criterion, and/or the total number of work cycles of the working head 1, together with a predetermined limit value of work cycles (which can act as a comparison value), a value indicative of an accumulated fatigue damage and/or of an accumulated wear damage, a value indicative of accumulated fatigue damage and/or of accumulated wear damage, together with one or more limit values of reference (which can act as comparison values), predetermined or calculated based on a predetermined limit criterion.

According to an embodiment, the cumulative state signal is transmitted to the actuation part 2, for example, by means of the local wireless transceiver 9, or by means of the local connector 11, to allow a verification and/or signaling of a cumulative use state and/or a need for maintenance of the jaws 4 of the working head 1.

According to an embodiment, the working head 1 comprises a local signaling device 13 fixed to the working head 1 and connected to the local processor 7, for the (preferably automatic) signaling of a cumulative use state and/or a need for maintenance of the jaws 4 of the working head 1.

The local processor 7 can operate the local signaling device 13 depending on the cumulative datum stored in the local storage 6 and a predetermined limit criterion, which can be stored in the local storage 6.

The predetermined limit criterion can comprise a maximum number of work cycles and/or a calculation formula or instruction of fatigue stress and/or a calculation formula or instruction of wear of components of the working head 1, in particular of the jaws 4.

The local signaling device 13 can comprise an acoustic and/or optical indicator, for example, LED, preferably a red-light indicator, which turns on when a predetermined use limit is reached.

The local signaling device 13 could further comprise a green light indicator, which switches on when using the working head 1 and in the absence of a need for maintenance.

Therefore, each working head 1 is capable of recognizing, independently of the actuation part 2 on which it is mounted, the state of use thereof and consequently signaling the need for maintenance.

According to an embodiment, the working head 1 comprises a local source of electrical power 15 fixed to the working head 1 and connected to the local processor 7 and, if included, to the local stress detection device 8, the local transceiver 9 and the local signaling device 13.

This overcomes the need for an electrical connection between the actuation part 2 and the working head 1 and makes the electronic functions of the working head 1 energetically independent with respect to the actuation part 2.

The local source of electrical power 15 can comprise a local battery 16 and/or a local converting device 17, which converts mechanical energy into electrical energy and which is connected, or connectable, so as to absorb mechanical energy (for example, from the actuation member 5 or from the jaws 4) when using the working head 1.

The local converting device 17 can comprise, for example, a piezoelectric converter and/or a linear or rotational inductive alternator.

According to an embodiment, the local processor 7 can be configured to generate and provide an identification signal of the working head 1. The identification signal can comprise a univocal identification code of the working head 1 and/or a type code, which identifies the type (shape, size) of the jaws 4 of the working head 1.

According to an embodiment, the identification signal is transmitted, for example, by means of the local wireless transceiver 9, or by means of the local connector 11, to the actuation part 2 to allow the operation of the actuation part 2 depending on the type of jaws 4 of the working head 1.

According to an embodiment, one or more of the local storage 6, local processor 7, local transceiver 9, local source of energy 15 and local signaling device 13 can be integrated or connected in a local control circuit 18 housed in a protective housing 19, for example, made of plastic or rubber, preferably inside a cavity formed in the working head 1.

In an embodiment (FIGS. 1 and 2), both of the jaws 4 are connected to the connecting portion 3 in a rotational and/or translational manner with respect to each other and have one or more cam tracks 20 engageable by the actuation member 5, for example, an actuation piston or an actuation stem of the actuation part 2. The connecting portion 3 can form one or more walls 22, with one or more holes 21, into which the walls 22 can be inserted in corresponding slots 23 of the actuation part 2, and the holes 21 can receive a pin 24 for the reversible locking of the walls 22 in the slots 23, and thus of the working head 1, to the actuation part 2.

In a further embodiment (FIG. 3), the working head 1 can comprise a body 25 with an actuation cylinder 30, which receives an actuation piston 26, movable by means of a pressure fluid, and which embodies the actuation member 5.

The two jaws 4 are movably connected to the body 25 with respect to each other and engaged by the actuation piston 26 so that, in response to the displacement of the actuation piston 26, the jaws 4 perform the movement between the open position and the closed position.

A return spring 27 acts on the actuation piston 26 so as to elastically urge it into a rest position, in which the jaws 4 are in the open position.

The working head 1 is removably connectable to the actuation part 2 by means of a hydraulic connector 28, which embodies the removable connecting portion 3. In detail, the hydraulic connector 28 can be connected to a flexible pressure pipe 29 of the actuation part 2. Alternatively, the flexible pipe 29 can be fixed to the working head 1 and form the hydraulic connector 28 for the connection with the actuation part 2.

General Description of the Entire Compression or Cutting Tool 100

According to an aspect of the invention, a compression or cutting tool 100 comprises:

an actuation part 2 operable for displacing an actuation member 5, a working head 1 with a connecting portion 3, which removably connects the working head 1 to the actuation part 2, and to two jaws 4, connected in a movable manner with respect to each other and engageable by the actuation member 5 so that, in response to the movement of the actuation member 5, the jaws 4 perform a relative movement between an open position and a closed position to perform the compression or the cutting, a local electronic storage 6 configured to store one or more cumulative data representative of a stress history of the jaws 4, said local storage 6 being fixed to the working head 1 and removable from the actuation part 2 together with the working head 1, a stress detection device 8 configured to detect the implementation of a work cycle by means of the jaws 4 and generate a stress signal referred to said work cycle, a local processor 7 in signal connection with the stress detection device 8 and configured for the processing of the stress signal and modify the cumulative datum in the local storage 6 depending on the stress signal.

Detailed Description of the Actuation Part 2

According to an embodiment, the stress detection device 8 lies in the actuation part 2 and connects electrically or by means of wireless transmission to the local processor 7 of the working head 1 when the working head 1 is connected to the actuation part 2.

The stress detection device 8 can comprise one or more of:

a pressure sensor 41 of a hydraulic fluid (preferred), an electrical magnitude sensor of an electric driving motor 31 (preferred), for example, a current sensor 42, a displacement or a distance sensor, an optical sensor, a linear transducer, a piezoelectric sensor, a magnetic proximity sensor, a contact sensor, a potentiometer.

The stress detection device 8 can be connected to, or form part of an electronic control circuit 32 of the actuation part 2.

The electronic control circuit 32 of the actuation part 2 is in signal connection with the local processor 7 of the working head 1, preferably by means of the aforesaid wireless transceiver 10 fixed to the actuation part 2 and configured for a wireless communication with the corresponding local wireless transceiver 9 of the working head 1.

Alternatively or additionally, a connector 12 can be included, fixed to the actuation part 2, for example, an electrical connector and/or an optical and/or an electromechanical connector (for example, an electromagnetic pusher), adapted to be removably connected or functionally coupled to a corresponding local connector 11 of the working head 1.

According to an embodiment, the electronic control circuit 32 of the actuation part 2 is configured to receive and process the cumulative state signal generated by the local processor 7 and control the operation of the actuation part 2 depending on the cumulative state signal.

According to an embodiment, the actuation part 2 comprises a maintenance signaling device 33 fixed to the actuation part 2 and connected to the control circuit 32, for the (preferably automatic) signaling of a cumulative use state and/or a need for maintenance of the jaws 4 of the working head 1.

The control circuit 32 can operate the maintenance signaling device 33 depending on the cumulative state signal and, optionally on a predetermined limit criterion.

The predetermined limit criterion can comprise a maximum number of work cycles and/or a calculation formula or instruction of fatigue stress and/or a calculation formula or instruction of wear of components of the working head 1, in particular of the jaws 4.

The maintenance signaling device 33 can comprise a display 40 and/or an acoustic and/or an optical indicator, for example, LED, preferably a red-light indicator, which turns on when a predetermined use limit is reached.

The maintenance signaling device 33 could further comprise a green light indicator, which turns on when using the working head 1 and in the absence of the need for maintenance.

Therefore, the actuation part 2 is capable of recognizing and communicating to the user the state of use of the working head 1 currently mounted, and consequently signaling a possible need for maintenance.

According to an embodiment, the electronic control circuit 32 is configured to prevent, or slow down the operation of the actuation part 2, in particular the movement of the actuation member 5, depending on the cumulative state signal and, optionally, on the aforesaid limit criterion, in particular, in the case of a need for maintenance or replacement of the working head 1.

In forced slowing down of the execution of compression or cutting work, for example, by means of a predetermined process of authorizations entered by the user in a user interface, connected to the control circuit 32, the user is allowed to complete a job if few compressions or cuts remain, but the user is motivated or forced to replace the working head 1 before proceeding with a series of several work cycles.

According to an embodiment, the control circuit 32 of the actuation part 2 can be configured to receive the aforesaid identification signal of the working head 1 and control the operation of the actuation part 2 also depending on the type of jaws 4 mounted of the working head 1.

The actuation part 2 can comprise an electromechanical, electrohydraulic or electric drive or a drive with a combustion engine.

According to an embodiment, the actuation part 2 comprises a housing 34, an accumulator slot 35 adapted to receive an accumulator 36 and having electrical terminals, which make an electrical contact with the accumulator 36, an electric motor 31 which is supported by the housing 34 and that can be powered by means of the accumulator 36, a hydrodynamic unit 37 (pumping unit) supported by the housing 34 and connected to the electric motor 31, so as to perform, in response to the movement of the electric motor 31, an increase in pressure of a hydraulic fluid acting on an actuation piston 26, and the aforesaid electronic control circuit 32 connected to the electric motor 31 and to the accumulator 36 for controlling the electric motor 31.

Alternatively, instead of the hydrodynamic unit 37 a transmission unit and/or mechanical conversion can be comprised, for example, a screwjack or connecting rod-crank mechanism, supported by the housing 34 and connected to the electric motor 31 so as to perform, in response to the movement of the electric motor 31, the displacement of the actuation member 5.

Instead of the electric motor 31, a combustion engine or pneumatic drive can be comprised, which can be controlled by the electronic control circuit 32, for example, according to the methods described with reference to the electric motor.

Conventionally, the control circuit 32 comprises a switch, on which an actuation button 38 acts for switching on the motor of the actuation part 2.

In particular, the control circuit 32 can comprise a processing unit (CPU), a storage associated with the processing unit (CPU), a communication interface associated with the processing unit (CPU) and adapted to receive signals, for example, signals of the stress detection device 8 (pressure of the hydraulic fluid, current of the electric motor, position), the cumulative state signals of the working head 1, the identification signals of the working head 1, and to transmit command signals to the motor and stress signals to the working head 1.

The control circuit 32 further comprises an electronic computer program loaded in the storage and configured to process the signals and operations required to implement the method for operating the tool 1.

According to an embodiment, the actuation part 2 of the tool 100 can comprise a user interface 39, for example, a push-button panel, connected to the control circuit 32, allowing the user to select the tool 100 operating modes.

The actuation part 2 further comprises a display 40, for example, a LCD or LED display, connected to the control circuit 32, which can also perform the role of the aforesaid maintenance signaling device 33.

The invention relates to both the entire compression tool 100, the working head 1 by itself as an interchangeable component or accessory and the actuation part 2 itself.

The terms "fixed to the working head 1" and "fixed to the actuation part" indicate that the component or function described lies in the working head 1/the actuation part 2, also after the uncoupling of the working head 1 from the actuation part 2, but it does not necessarily mean that the component or function cannot be dismantled or removed from the working head 1/from the actuation part, for example, with the purpose of repairing or replacing the component. The component could be fixed and not removable or fixed but detachable.

Description of the Method for Operating the Compression or Cutting Tool 100

According to a further aspect of the invention, a method is suggested for operating a compression or cutting tool 100, comprising the steps of:
  connecting a working head 1 removably to an actuation part 2 of the tool 100,
  where the working head 1 comprises two jaws 4 connected in a movable manner with respect to each other and engageable by an actuation member 5 so as to perform a relative movement between an open position and a closed position to perform the compression or the cutting,
  performing work cycles, displacing the actuation member 5 by means of the actuation part 2,
  storing, in a local storage 6, one or more cumulative data representative of a stress history of the jaws 4, where said local storage 6 is fixed to the working head 1 and detachable from the actuation part 2 together with the working head 1,
  detecting the implementation of said work cycles,
  generating a stress signal referred to each of said work cycles,
  processing the stress signal and modifying, in the local storage 6, the cumulative datum depending on the stress signal.

The further steps and features of the method were already described in the previous description of the tool 100, the working head 1 and the actuation part 2, and are not repeated here for the sake of brevity.

Obviously, those skilled in the art may make further modifications and variations to the compression and/or cutting tool, to the working head, to the actuation part and to the method according to the invention with the purpose of meeting specific and contingent needs, all included in the protective scope of the invention, as defined by the following claims.

The invention claimed is:

1. A working head for a compression or cutting tool, comprising:
  a connecting portion for a removable connection of the working head with an actuation part of the tool,
  two jaws connected in a movable manner with respect to each other and displaceable by means of an actuation member between an open position and a closed position to perform the compression or the cutting,
  a local storage configured for storing one or more cumulative data representative of a stress history of the jaws, wherein said local storage is fixed to the working head,
  a local processor electrically connected to the local storage and configured for:
    receiving and processing a stress signal indicative of the fact that a work cycle is carried out by means of the jaws, and
    modifying the cumulative data in the local storage depending on the stress signal, said local processor being fixed to the working head, and
  a stress detection device in signal connection with the local processor and configured for detecting that a work cycle is carried out and for generating said stress signal referred to said work cycle, said stress detection device being fixed to the working head and connects to an electronic control circuit of the actuating part, and wherein the electronic control circuit transmits the stress signal to the local processor when the working head is connected to the actuation part.

2. A working head according to claim 1, wherein the stress detection device comprises a sensor chosen from the group consisting of:
  a force sensor,
  a deformation sensor,
  a displacement sensor,
  a distance sensor,
  a hydraulic fluid pressure sensor,
  an optical sensor,
  a linear transducer,
  a piezoelectric sensor, a magnetic proximity sensor, a contact sensor, a potentiometer,
a microswitch,
wherein said sensor is responsive to displacements of the actuation member.

3. A working head according to claim 1, comprising local signal connection means fixed to the working head and adapted to establish a signal connection with corresponding signal connection means fixed to the actuation part.

4. A working head according to claim 1, comprising a local transceiver connected to the local processor and configured for a wireless communication with a transceiver of the actuation part, said local transceiver being fixed to the working head.

5. A working head according to claim 1, wherein the local processor is configured for receiving said stress signal from the actuation part.

6. A working head according to claim 1, wherein the local processor is configured for generating a cumulative state signal depending on the cumulative datum stored in the local storage and for transmitting the cumulative state signal to the actuation part.

7. A working head according to claim 6, wherein the cumulative state signal codifies data chosen from the group consisting of:
the total number of the work cycles of the working head,
a residual number of work cycles of the working head to reach a limit value of work cycles, said limit value of work cycles being predetermined or calculated based on a predetermined limit parameter,
the total number of work cycles of the working head together with a predetermined limit comparison value,
a value indicative of an accumulated fatigue damage and/or of an accumulated wear damage,
a value indicative of an accumulated fatigue damage and/or of an accumulated wear damage, together with one or more limit comparison values which are predetermined or calculated based on a predetermined limit parameter.

8. A working head according to claim 1, comprising a local signaling device fixed to the working head and connected to the local processor for signaling a need for maintenance based on the cumulative datum stored in the local storage and on a predetermined limit criterion.

9. A working head according to claim 1, comprising a local source of electrical power fixed to the working head, said local source of electrical power comprising a local battery and/or a local converting device that converts mechanical energy into electrical energy.

10. A compression or cutting tool comprising the working head and the actuation part according to claim 1, wherein the working head includes local signal connection means connected to the local processor, and wherein said actuation part comprises signal connection means connected to the electronic control circuit and configured for establishing a signal connection with the local signal connection means.

11. A compression or cutting tool according to claim 10, wherein the stress detection device comprises a sensor selected from the group consisting of: a hydraulic fluid pressure sensor of a hydrodynamic unit, a current sensor of an electric driving motor, a displacement or a distance sensor, an optical sensor, a linear transducer, a piezoelectric sensor, a magnetic proximity sensor, a contact sensor, a potentiometer.

12. A compression or cutting tool according to claim 10, wherein said signal connection means comprise a wireless transceiver.

13. A compression or cutting tool according to claim 10, wherein the electronic control circuit is configured for receiving a cumulative state signal generated by the local processor of the working head and for controlling the operation of the actuation part depending on said cumulative state signal.

14. A compression or cutting tool according to claim 13, comprising a maintenance signaling device connected to the control circuit for signaling a need for maintenance of the working head depending on the cumulative state signal and on a predetermined limit parameter.

15. A compression or cutting tool according to claim 14, wherein the predetermined limit parameter comprises a maximum number of work cycles or a computation instruction of a maximum cyclic stress.

16. A compression or cutting tool according to claim 14, wherein the maintenance signaling device comprises one or more from a display, an acoustic indicator, an optical indicator, a colored LED.

17. A compression or cutting tool according to claim 13, wherein the electronic control circuit is configured for preventing or slowing down the operation of the actuation part when maintenance of the working head is needed depending on the cumulative state signal and on a predetermined limit parameter.

18. A compression or cutting tool, comprising the working head and the actuation part of claim 1.

19. A method for operating a compression or cutting tool, comprising the steps of:
providing the working head and the actuation part according to claim 1,
removably connecting the working head to the actuation part,
carrying out work cycles, by displacing the actuation member by means of the actuation part,
storing in the local storage one or more cumulative data representative of a stress history of the jaws, wherein said local storage is removable from the actuation part together with the working head,
detecting that said work cycles are carried out,
generating the stress signal referred to each of said work cycles,
processing the stress signal and modifying the cumulative datum in the local storage based on the stress signal.

* * * * *